United States Patent
Lee et al.

(10) Patent No.: US 6,401,196 B1
(45) Date of Patent: *Jun. 4, 2002

(54) DATA PROCESSOR SYSTEM HAVING BRANCH CONTROL AND METHOD THEREOF

(75) Inventors: Lea Hwang Lee, Austin; William C. Moyer, Dripping Springs; Jeffrey W. Scott; John H. Arends, both of Austin, all of TX (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,669

(22) Filed: Jun. 19, 1998

(51) Int. Cl.$^7$ .................................................. G06F 9/12
(52) U.S. Cl. ................... 712/241; 712/230; 712/239; 711/213; 711/214
(58) Field of Search ................ 712/241, 239, 712/237, 230; 711/213, 214

(56) References Cited

U.S. PATENT DOCUMENTS

| | | | | |
|---|---|---|---|---|
| 3,573,854 A | * | 4/1971 | Watson et al. | 712/237 |
| 4,566,063 A | * | 1/1986 | Zolnowsky et al. | 712/241 |
| 5,051,896 A | * | 9/1991 | Lee et al. | 712/226 |
| 5,778,423 A | * | 7/1998 | Sites et al. | 711/118 |
| 5,893,142 A | * | 4/1999 | Moyer et al. | 711/125 |
| 5,898,866 A | * | 4/1999 | Atkins et al. | 712/241 |
| 5,920,713 A | * | 7/1999 | Favor | 712/236 |

FOREIGN PATENT DOCUMENTS

| | | |
|---|---|---|
| EP | 0 374 419 A3 | 6/1990 |
| EP | 0 374 419 A2 | 6/1990 |

OTHER PUBLICATIONS

Joe Jelemensky et al., "The MC68332 Microcontroller", Aug. 1989 IEEE, pp. 31–50.
EPO Communication and Search Report.
"LOOPT Branch on True, Decrementing Count, Set C Bit on Greater Than," M–CORE microRISC Engine Programmers's Reference Manual, p. 3–59 (1997).
Ditzel et al., "Branch Folding in Crisp Microprocessor: Reducing Branch Delay to Zero," IEEE 14th Annual International Symposium on Computer Architecture, pp. 2–9 (1987).

* cited by examiner

*Primary Examiner*—Richard L. Ellis
*Assistant Examiner*—Gautam R. Patel (57) ABSTRACT

A specific implementation is disclosed where a backward branch address instruction is fetched at a branch address. The backward branch instruction has an offset value to define the size of a program loop. A counter is set to a value that is proportional to the size of the loop. In one example the counter is set to the offset value. As each instruction of the loop is executed the counter is modified to indicate a remaining number of instructions in the loop. When no instructions remain in the current pass of the loop, the counter is reset to the offset value and the loop is repeated until a termination condition encountered. As part of the implementation the instruction after the branch instruction is read and stored prior to the loop being executed.

12 Claims, 8 Drawing Sheets

DATA PROCESSOR SYSTEM HAVING BRANCH CONTROL AND METHOD THEREOF

CROSS REFERENCE TO RELATED APPLICATION

A related application entitled "Distributed Tag Cache Memory System and Method for Storing Data in the Same," by William C. Moyer et al., and having U.S. application Ser. No. 08/748,856 was filed on Nov. 14, 1996.

A related application entitled "Data Processing System Having a Cache and Method Therefor," by William C. Moyer et al., and having U.S. patent application Ser. No. 08/748,855 was filed on Nov. 14, 1996.

FIELD OF THE INVENTION

This invention relates generally to data processing, and more particularly, to a data processing system having optimized branch control and method thereof.

BACKGROUND OF THE INVENTION

Lower power design techniques have been gaining importance in microprocessor and microcontroller design due to the widespread use of portable and hand held applications. Such applications require long battery life and low system cost. A portable application typically operates alternatively between two operating modes: (i) burst mode, where active computations are performed; and (ii) power-down mode (or sleep mode), where the system is asleep waiting for a new computational event to occur. If a subsystem (microprocessor included) consumes only a small fraction of the overall system power, then low cost and high performance should be the design goals for the subsystem.

Branches have long been recognized as a major factor in degrading the performance of a pipelined machine. This is due to the fact that branches break the continuous flow of the instruction stream. Also, branches often can only be resolved deep into the execution pipeline. Techniques such as branch prediction and speculative execution are widely employed to reduce the adverse effect of branches. These techniques, unfortunately, often call for hardware intensive implementations. Other alternative low cost approaches are needed to improve the performance on branches.

Prior methods used to optimize branch paths taken by microprocessors have been used. One prior method of optimizing the execution of branch instructions is known as software loop unrolling. Software loop unrolling occurs at compile time when it is known that a specific loop will be executed many times. Software loop unrolling duplicates the code within the loop and reduces the number of iterations through the loop by a factor equal to the number of times the code has been duplicated. For example, if it is known at compile time that a specific software loop will be executed 100 times, it will be possible to place two copies of the code contained within the unrolled loop, and execute the actual branch only 50 times. However, such a technique, while potentially saving cycles per iteration, creates a larger static program size.

Another known prior art technique to optimize branching has been to use a special loop instruction. Prior art special loop instructions were designed such that a branch and a decrement (or increment) of the loop counter occur within a single instruction. As a result, one clock cycle per iteration is saved. However, each special loop instructions requires a unique instruction opcode. Therefore, while the use of special branch instructions can save a clock cycle per iteration, it is accomplished at the cost of a larger instruction set.

Yet another prior art method incorporates a loop mode along with special loop instructions. Loop mode is an instruction which indicates that the preceding instruction is to be repeated a specified number of times. Such an implementation avoids having to fetch the instruction which is to be executed numerous times sequentially. However, this technique requires the existence of the special loop instructions, and limits the loop body to a single instruction.

Therefore, a more versatile method of branching which minimizes the number of clock cycles needed to execute program loops would be desirable.

DESCRIPTION OF A PREFERRED EMBODIMENT

Figure 1:
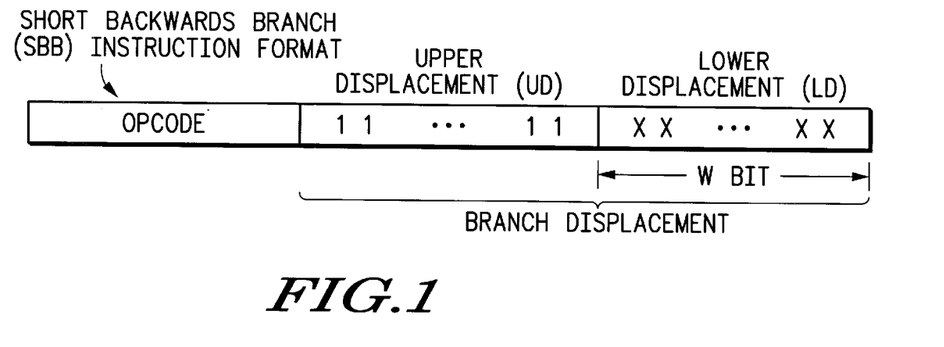
FIG. 1 illustrates the instruction format for Short Backwards Branch (SBB) instructions.
Figure 2:
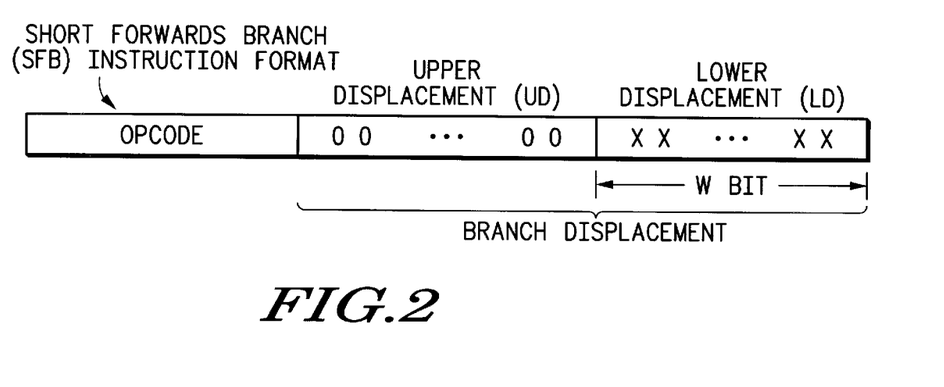
FIG. 2 illustrates the instruction format for Short Forwards Branch (SFB) instructions.

FIG. 1 illustrates the instruction format for Short Backwards Branch instructions, denoted as SBB. FIG. 2 illustrates the instruction format for Short Forwards Branch instructions, denoted as SFB. The SBB and SFB are conditional or unconditional PC-relative branch instructions. Different branch instructions (with different opcodes) can collectively be defined as SBB instructions or SFB instructions.

These instructions can be divided into two fields: (i) opcode, which specifies the type of branch; and (ii) branch displacement—the displacement to be added to the program counter (PC) to form the branch target address. For SBB instructions, the branch displacement has leading ones, indicating that it has a negative branch displacement, and when added to the PC, produces a backward branch target. Likewise, for SFB instructions, the branch displacement has leading zeros, indicating that it has a positive branch displacement.

The branch displacement field can be further divided into two fields: (i) an upper displacement field, denoted as UD; and (ii) a lower displacement field, denoted as LD. The upper displacement field is all ones for SBB, and all zeros for SFB. In one embodiment, the width of the LD field of SBB and SFB are the same, namely, w bits wide. By definition, a SBB has a limited backwards branch distance, given by $2^w$, where w is the width of the LD field. Likewise, a SFB has a limited forward branch distance given by $2^w$.

Figure 3:
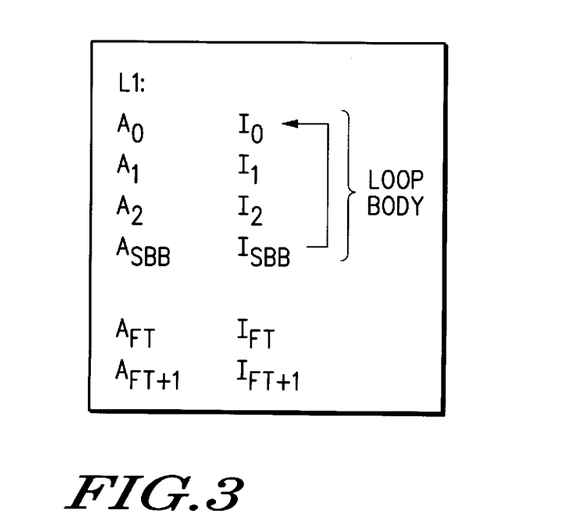
FIG. 3 illustrates a program loop containing a SBB at the end of the loop.

FIG. 3 illustrates a program loop containing a SBB instruction at the end of the loop. The SBB instruction is located at address $A_{SBB}$. The instruction following the SBB is designated as the fall-through instruction ($I_{FT}$) located at address $A_{FT}$. Likewise, the instruction following $I_{FT}$ is $I_{FT+1}$ located at address $A_{FT+1}$.

Figure 4:
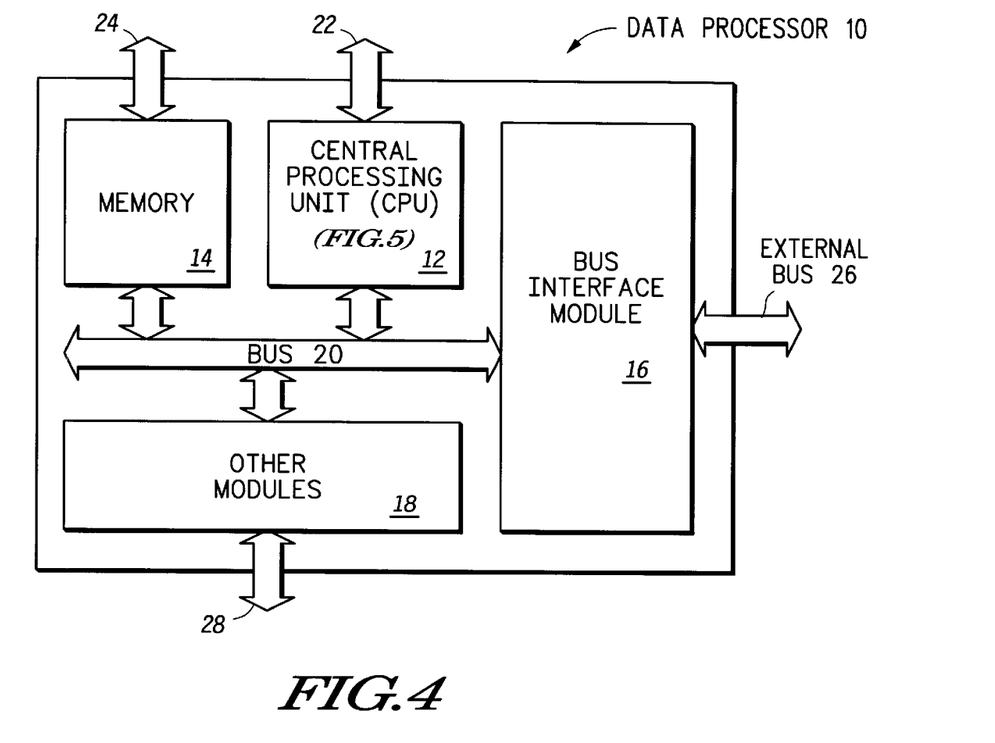
FIG. 4 illustrates, in block diagram form, a data processing system in accordance with the present invention.

FIG. 4 illustrates, in block diagram form, a data processor 10 in accordance with one embodiment of the present invention. In one embodiment, data processor 10 includes a central processing unit (CPU) 12, memory 14, bus interface module 16, and other modules 18, which are all bi-directionally coupled to each other by way of bus 20. Bus interface module 16 may be coupled external to data processor 10 by way of external bus 26. Other modules 18 are optionally coupled external to data processor 10 by way of one or more integrated circuit terminals 28. Memory 14 is optionally coupled externally to data processor 10 by way of one or more integrated circuit terminals 24. Central processing unit 12 is optionally coupled external to data processor 10 by way of one or more integrated circuit terminals 22.

Still referring to FIG. 4, alternate embodiments of the present invention may use any type of structure for data processor 10. In addition, data processor 10 may perform a wide variety of functions. For example, data processor 10 may use a RISC (Reduced Instruction Set Computer) architecture, may use a Harvard architecture, may be a vector processor, may be a SIMD (Single Instruction Multiple Data) processor, may perform floating point arithmetic, may perform digital signal processing computations, etc.

Figure 5:
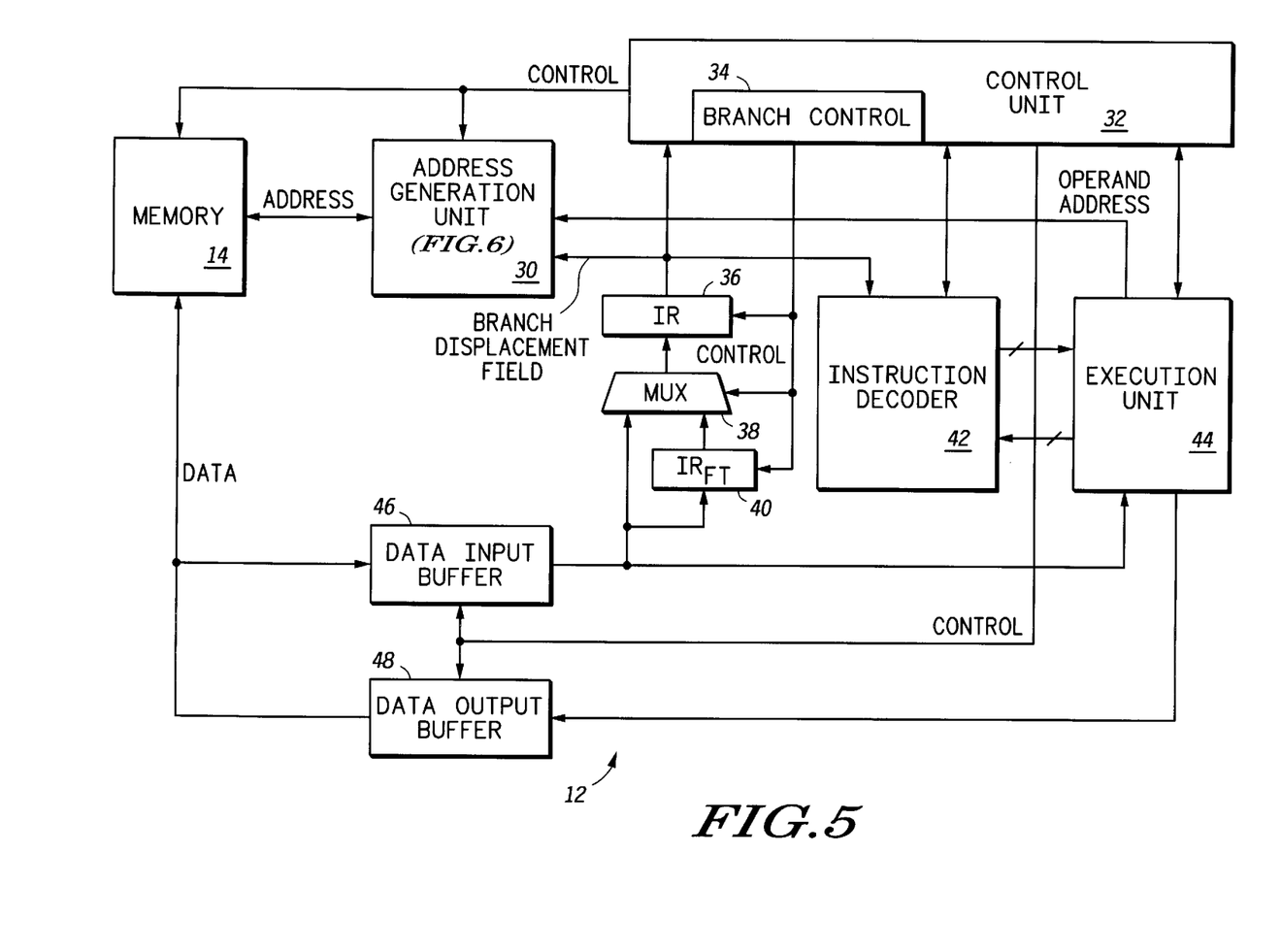
FIG. 5 illustrates in block diagram form, the CPU 12 of FIG. 4.

FIG. 5 illustrates, in block diagram form, CPU 12 in accordance with the present invention. CPU 12 includes address generation unit 30, control unit 32, instruction register (IR) 36, multiplexer 38, fall through instruction register ($IR_{FT}$) 40, instruction decoder 42, execution unit 44, data input buffer 46, and data output buffer 48. Control unit 32 includes branch control 34.

Memory 14 is coupled to an address bus for receiving an address labeled "ADDRESS", and to a data bus for receiving and providing data labeled "DATA". Memory 14 can be any kind of conventional memory including volatile memories such as static random access memories (SRAMs), and dynamic random access memories (DRAMs) or non-volatile memories such as electrically programmable read only memories (EPROM) and flash memory. Also, memory 14 may be on the same integrated circuit as CPU 12 or may be located externally to CPU 12. Address generation unit 30 has a first plurality of input terminals for receiving an operand address labeled "OPERAND ADDRESS" from execution unit 44, a second plurality of input terminals for receiving a branch displacement field from instruction register 36, and a plurality of output terminals for providing address signals "ADDRESS" to memory 14. Address generation unit and memory 14 are controlled by control unit 32 via control signals labeled "CONTROL".

Multiplexer 38 has a first plurality of input terminals for receiving instructions from data input buffer 46, a second plurality of input terminals coupled to the output terminal of fall-through instruction register ($IR_{FT}$) 40, and a plurality of output terminals for providing either the instruction from data input buffer 46 or the fall through instruction stored in register 40. Branch control 34 provides the control signals for controlling the operation of instruction register 36, multiplexer 38, and fall through instruction register 40.

Data input buffer 46 receives data from memory 14, and provides buffered data to execution unit 44 and/or instructions to the first plurality of input terminals of multiplexer 38. Data output buffer 48 receives output data from execution unit 44, and provides data to be written into memory 14. Data input buffer 46 and data output buffer 48 are controlled by control signals provided by control unit 32.

Instruction decoder 42 is coupled to instruction register 36 for receiving an instruction. Instruction decoder 42 is coupled to execution unit 44. Execution unit 44 is coupled to data input buffer 46 for receiving data from memory 14. Likewise, execution unit 44 is coupled to data output buffer 48 for providing data to memory 14. Execution unit 44 selectively executes the instructions which are decoded by instruction decoder 42, and provides the result to data output buffer 48 or to Address Generation Unit 30. Execution unit 44 may include, for example, an arithmetic logic unit (ALU).

Control unit 32 is coupled to instruction register 36 for receiving instructions, and in response, provides control signals labeled "CONTROL" for control the operation of address generation unit 30 and memory 14. Control unit 32 is coupled to instruction decoder 42 and to execution unit 44. Execution unit 44 provides condition code information to control unit 32.

Data processing system 10 executes instructions in a four stage pipeline. The four stages include a fetch stage, a decode stage, an execution stage, and a write back stage. During the instruction fetch stage, an instruction is retrieved from memory, such as from memory 14. The instruction is then decoded in instruction decoder 42. The decoded instruction is provided to execution unit 44 and controls the operation of execution unit 44. The execution unit 44 then writes back the results of instruction execution to memory 14 via data output buffer 48.

Figure 6:
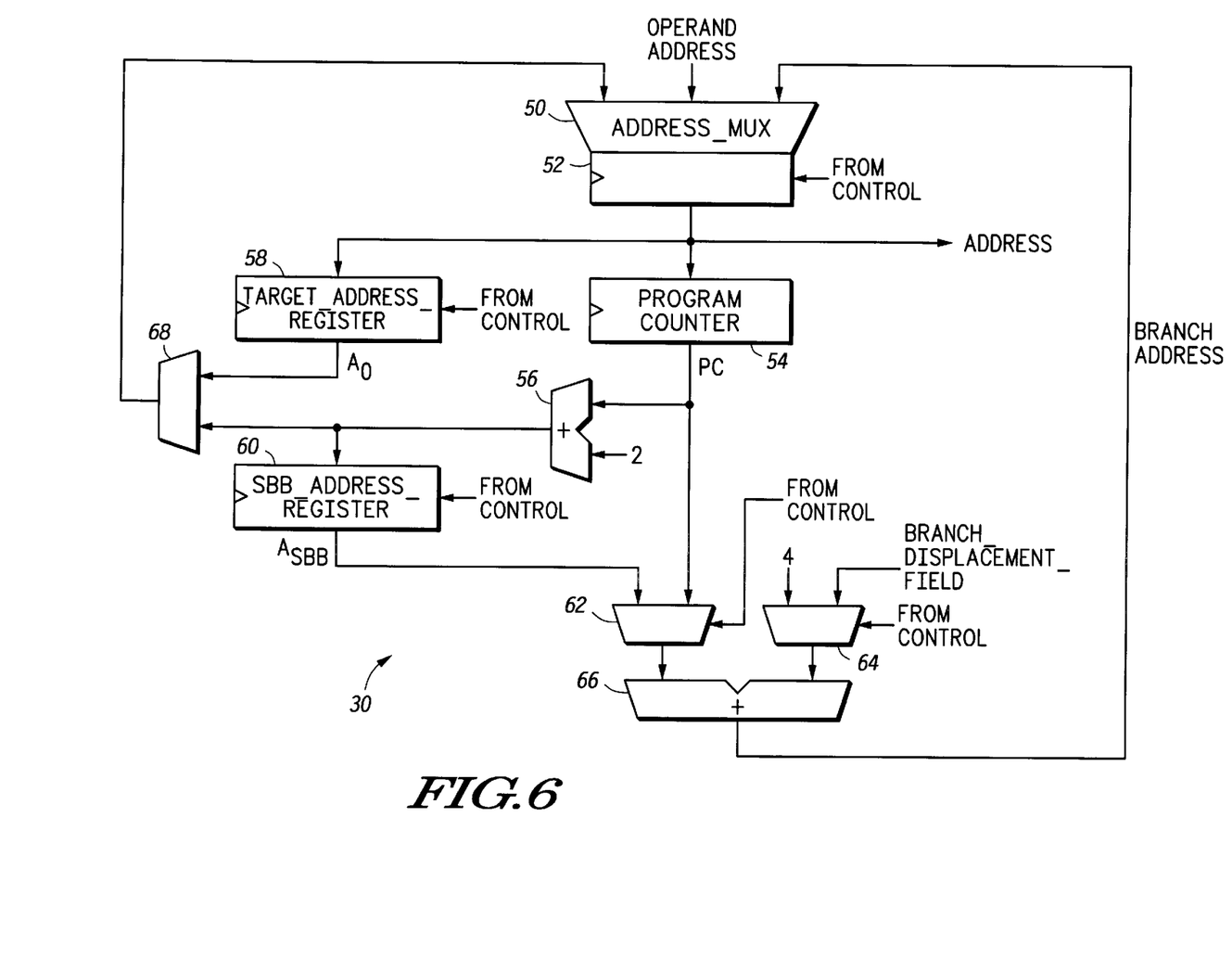
FIG. 6 illustrates, in partial block diagram form and partial logic diagram form, address generation unit 30 of FIG. 5 in more detail.

FIG. 6 illustrates, in partial block diagram form and partial logic diagram form, address generation unit 30 of FIG. 5 in more detail. Address generation unit 30 includes address multiplexer 50, register 52, program counter 54, target address register 58, adder 56, SBB address register 60, multiplexer 62, multiplexer 64, adder 66 and multiplexer 68. Address multiplexer 50 has a first plurality of input terminals for receiving an address labeled "OPERAND ADDRESS", a second plurality of input terminals coupled to the output terminals of adder 66, a third plurality of input terminals coupled to the output terminals of multiplexer 68, and a plurality of output terminals coupled to the input terminals of registers 52. Registers 52 have a plurality of output terminals for providing address signals labeled "ADDRESS" to input terminals of program counter 54 and to input terminals of register 58. Program counter 54 has a plurality of output terminals coupled to a first plurality of input terminals of adder 56, and to a first plurality of input terminals of multiplexer 62. Adder 56 adds the output of program counter 54 to "2" and provides the result on output terminals to a second plurality of input terminals of multiplexer 68 and to the input terminals of register 60. The "2" is added the to program counter 54 because the instruction width is equal to two bytes. Note that although a "2" is added to the program counter value in the illustrated embodiment, other embodiments that have different instruction widths would use a different number. Output terminals of register 60 labeled "$A_{SBB}$" are coupled to the second plurality of input terminals of multiplexer 62. Multiplexer 64 has a first plurality of input terminals for receiving "4" as an input and a second plurality of input terminals coupled to instruction register 36 for receiving a branch displacement field of an instruction. A "4" is added to $A_{SBB}$ so that the $A_{FT+1}$ can be provided to memory 14. $A_{FT+1}$ is the address for $I_{FT+1}$, which is two instructions after SBB. In other embodiments, $A_{FT+1}$ may be generated using other methods. Multiplexer 64 has a plurality of output terminals coupled to the second plurality of input terminals of adder 66. Output terminals of adder 66 labeled "BRANCH ADDRESS" are coupled to input terminals of address multiplexer 50.

Figure 7:
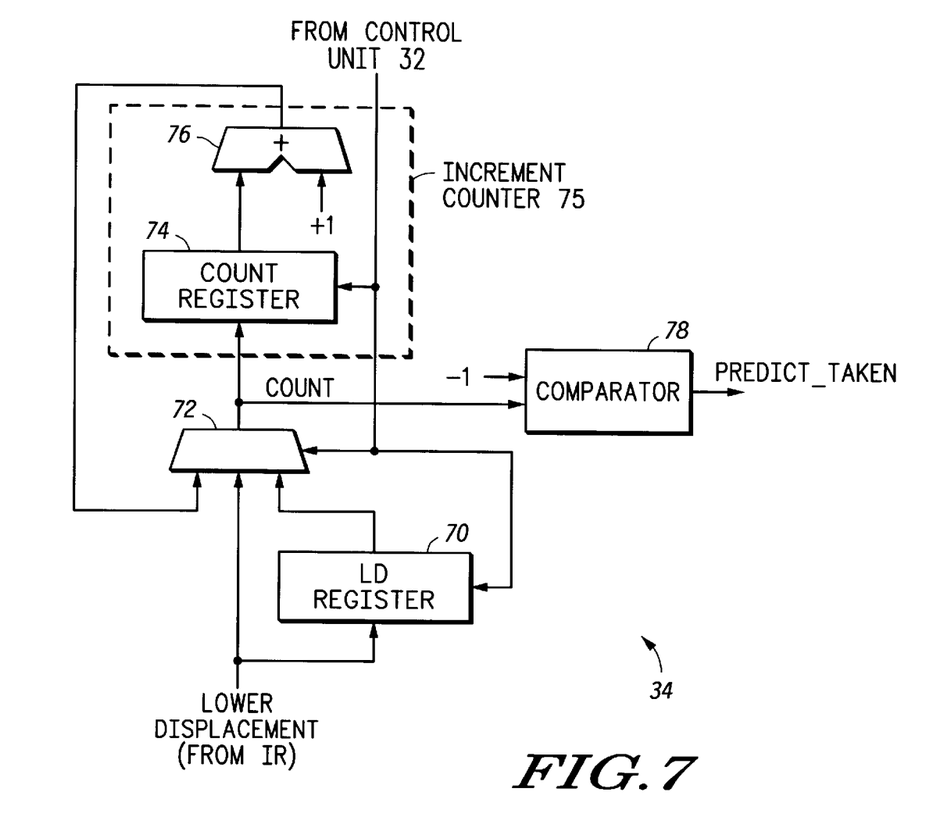
FIG. 7 illustrates, in partial block diagram form and partial logic diagram form, branch control 34 of FIG. 5 in more detail.

FIG. 7 illustrates, in partial block diagram form and partial logic diagram form, branch control 34 of FIG. 5 in more detail. Branch control 34 includes a state machine (not shown in this figure), LD register 70, multiplexer 72, count_register 74, adder 76 and comparator 78. LD register 70 has a plurality of input terminals for receiving the lower displacement bits of the branch displacement field of an instruction from instruction register 36, and a plurality of output terminals coupled to a first plurality of input terminals of multiplexer 72. Multiplexer 72 also has a second plurality of input terminals for receiving the lower displacement bits from instruction register 36, and a third plurality of input terminals coupled to the output of adder 76. A plurality of output terminals of multiplexer 72 labeled "COUNT" is coupled to input terminals of count_register 74. Output terminals of count_register 74 are coupled to a first plurality of input terminals of adder 76. Adder 76 has a second plurality of input terminals for receiving "1". Registers 70, 74 and multiplexer 72 are controlled from control unit 32. Comparator 78 has a first plurality of input terminals coupled to the output of multiplexer 72 and a second plurality of input terminals for receiving "–1", and an output for providing an end-of-loop signal labeled "PREDICT_TAKEN" to control unit 32. In other embodiments, other means may be used to generate the PREDICT_TAKEN signal, such as for example, address comparison.

Figure 8:
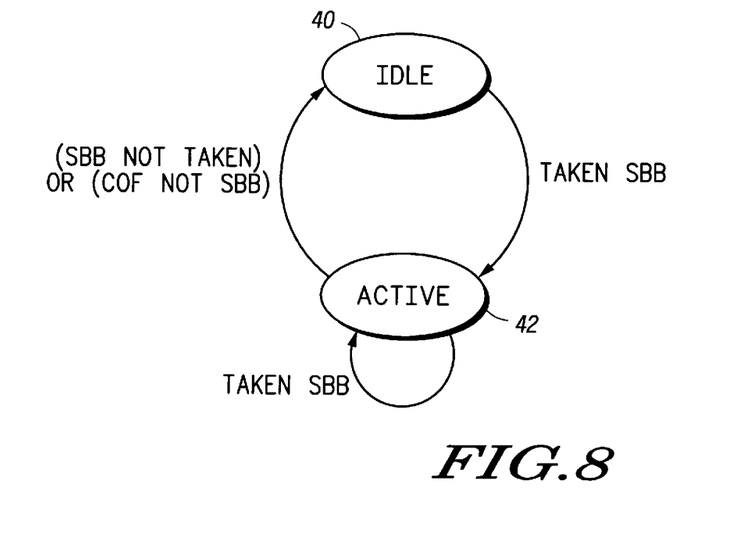
FIG. 8 illustrates a partial state diagram for describing the operation of a state machine of branch control 34.

FIG. 8 illustrates a simplified state diagram for describing the operation of a state machine of branch control 34 of FIG. 5. The state machine of branch control 34 has two operating states. The first state, IDLE state 40, indicates that a short backward branch (SBB) has not been detected. Upon detection of a SBB, and if the SBB is taken, the state machine of branch control 34 exits IDLE state 40 and enters ACTIVE state 42. In one embodiment, when in an ACTIVE state, if another SBB is detected and taken, the state machine will return to the IDLE state. In another embodiment, when in an ACTIVE state, if another SBB is detected and taken, the state machine will remain in the ACTIVE state. In this case, the LD register 70 and COUNT of FIG. 7 will be reloaded with the LD field of the newly encountered SBB. The state machine will return to the IDLE state when one of the following two conditions is met: (1) the detected SBB instruction that triggered the transition from an IDLE state to an ACTIVE state is not taken; or (2) a change of flow has occurred and it is not caused by the triggering SBB. Condition (1) corresponds to the case where the loop sequentially exits through the SBB at the end of the loop. Condition (2) corresponds to the case where there is a change of flow within the loop body with a destination which may or may not be inside the loop body.

Figure 9:
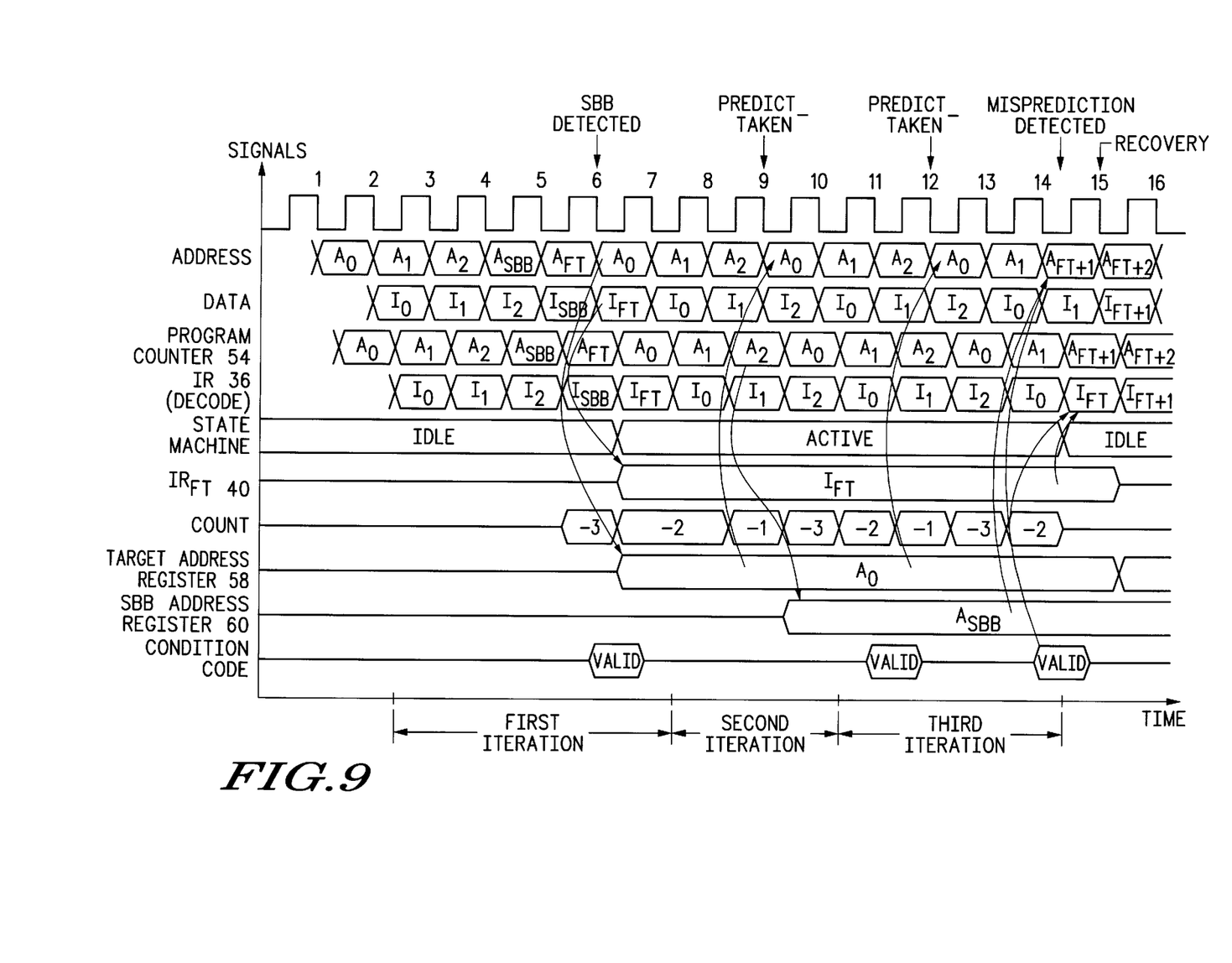
FIG. 9 illustrates a timing diagram of various signals of the data processing system of FIG. 4 in accordance with the present embodiment.

FIG. 9 illustrates a timing diagram of various signals of the data processing system of FIG. 4 in accordance with the present invention. Referring now to FIGS. 1 through 9, the operation of data processing system 10 will now be discussed.

Data processing system 10 generally executes instructions that are sequentially retrieved from memory 14 until a change of flow instruction, such as a branch instruction, is encountered. FIG. 9 illustrates the generation of addresses $A_0$ through $A_2$ on consecutive clock cycles. Also, data corresponding to each generated address is retrieved on each subsequent clock cycle. For example, instruction $I_0$ corresponding to address $A_0$ is retrieved from memory on cycle 2, instruction $I_1$ is retrieved on cycle 3 following the generation of address $A_1$, and so forth. At clock cycle 4, an address corresponding to the SBB instruction, namely, $A_{SBB}$, is issued to memory 14. The SBB instruction is detected at clock cycle 6. In response to the SBB instruction being detected, the target address, address $A_0$, is loaded into register 58. At the same time, a fall through instruction $I_{FT}$ is loaded into $IR_{FT}$ register 40. The $I_{FT}$ instruction is the instruction that immediately follows an SBB instruction in static program order.

One half clock cycle after each address is provided to memory 14 for retrieving instructions, the address is latched in program counter 54 as illustrated in FIG. 9. Note that clock cycles 3 through 7 define a first iteration. SBB detection occurs in the decode stage. When the SBB is found to be taken a cycle later, the state machine of control unit 32 goes from an IDLE state to an ACTIVE state. Also when the SBB is detected, the lower displacement field LD, from instruction register 36, is loaded into LD register 70 (FIG. 7). For each subsequent instruction that is executed, the COUNT, or loop value, of FIG. 4 is incremented by 1. An end of loop signal PREDICT_TAKEN (FIG. 7) is provided from comparator 78 to control unit 32. PREDICT_TAKEN is asserted when the COUNT of FIG. 7 reaches –1.

The second iteration of the loop proceeds until the COUNT reaches a value of –1 in clock cycle 9. At clock cycle 9 a prediction is made when the PREDICT_TAKEN signal is asserted to control unit 32, resulting in the target address $A_0$ being loaded from target address register 58 onto the address bus to memory 14.

Also, at clock cycle 9, the program counter 54 contains address $A_2$. This address is incremented by 2 using adder 56 producing a result of $A_{SBB}$. This resulting address is then loaded into the SBB address register 60. Program flow continues through the third iteration until cycle 12 where another prediction is made. Address $A_0$ is again taken from target address register 58 and provided to memory 14. At the end of clock cycle 14, as shown in this example, it is determined that the branch is mispredicted. A branch is determined to be mispredicted by the value of the condition code and the type of branch. Instruction $I_0$ has already been fetched and decoded when a misprediction is identified in cycle 14. The address previously loaded into SBB address register 60 is incremented by 4 producing a result of $A_{FT+1}$. This resulting address is then loaded onto the address bus to memory 14. This causes the instruction fetch to initiate from $A_{FT+1}$, thus preventing an execution bubble from occurring. The recovery starts one clock cycle following the misprediction and at this point instruction $I_0$ is in the execute stage. The execution of $I_0$ will be terminated. Following termination of execution of $I_0$, in response to the misprediction, instruction $I_{FT}$ is loaded from $IR_{FT}$ 40 into instruction register 36. Instruction execution then continues with $I_{FT}$. The misprediction also causes the state machine of FIG. 8 to transition from the ACTIVE to the IDLE state.

By simultaneously providing $I_{FT}$ to the instruction register 36 and issuing address $A_{FT+1}$ in the same cycle as the recovery cycle, i.e. cycle 15, a zero cycle misprediction penalty is achieved. Also, notice that the first iteration of the loop depicted in FIG. 9 takes five cycles. The second iteration with correct prediction takes only three cycles, which is two less than what it normally takes without folding branches. The third iteration with misprediction takes four cycles (not including the recovery cycle as $I_{FT}$ is decoded in that cycle).

In the embodiment described above, when in an ACTIVE state, if there is a change of flow that is not caused by the SBB that triggered the transition from an IDLE to the ACTIVE state, and the target of the change of flow is within the loop body, the state machine will exit the ACTIVE state. This occurs despite the fact that the destination of the change of flow may still be within the loop body. To overcome such limitations, the following embodiment provides an enhanced branch folding technique.

Figure 10:
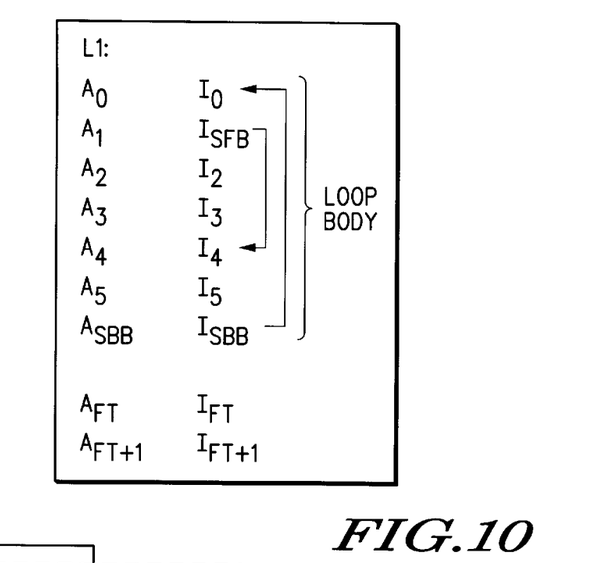
FIG. 10 illustrates a program loop containing a SBB and a SFB.

FIG. 10 illustrates a program loop containing a SBB at the end of the loop. It also contains a SFB within the loop body located at $A_1$. The destination of the SFB is $A_4$, and the forward branch distance is +3. FIG. 10, in conjunction with FIG. 12, will be used to describe an enhanced branch folding operation.

Figure 11:
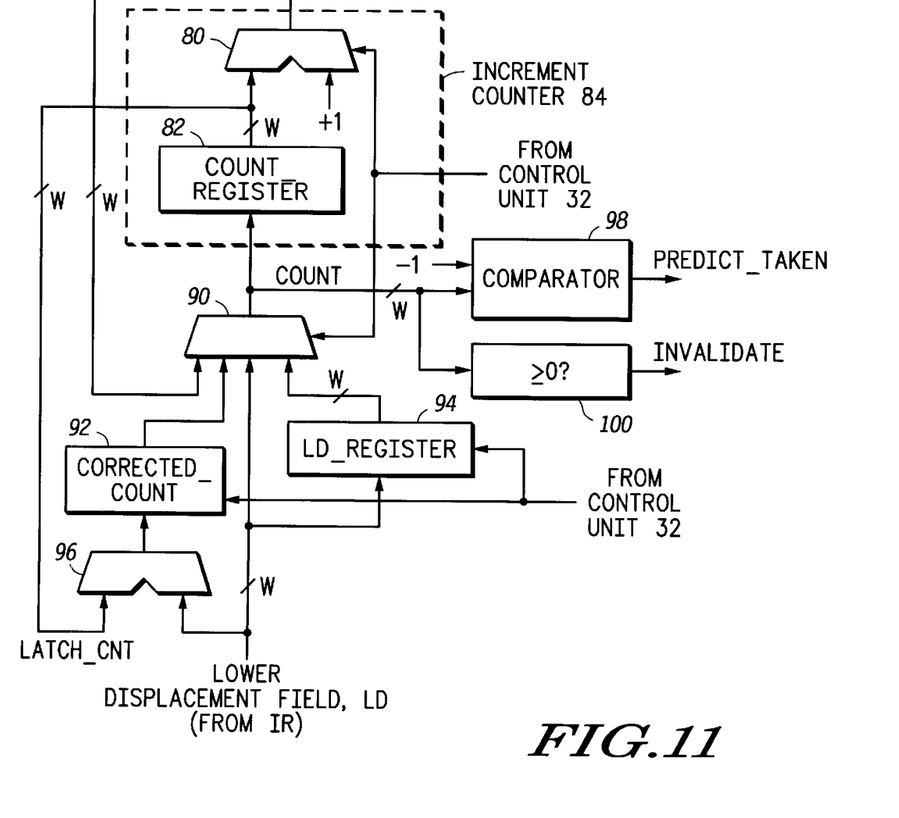
FIG. 11 illustrates, in partial block diagram form and partial logic diagram form, branch control 34 of FIG. 5 for an alternate embodiment.

FIG. 11 illustrates, in partial block diagram form and partial logic diagram form, branch control 34 of FIG. 5 in more detail. Branch control 34 includes a state machine (not shown in this figure), LD register 94, multiplexer 90, count_register 82, adder 80, comparator 98, non-negative detector 100, corrected_count register 92 and adder 96. Register 94 has a plurality of input terminals for receiving the lower displacement bits of the branch displacement field of an instruction from instruction register 36, and a plurality of output terminals coupled to a first plurality of input terminals of multiplexer 90. Multiplexer 90 also has a second plurality of input terminals for receiving the lower displacement bits from instruction register 36, a third plurality of input terminals coupled to the output of adder 80 and a fourth plurality of input terminals coupled to the output of the corrected_count register 92. A plurality of output terminals of multiplexer 90 labeled "COUNT" is coupled to input terminals of count_register 82.

Output terminals of count_register 82 are coupled to a first plurality of input terminals of adder 80. Adder 80 has a second plurality of input terminals for receiving "1". LD registers 94, count_register 82, corrected_count register 92 and multiplexer 90 are controlled from control unit 32. Comparator 98 has a first plurality of input terminals labeled "COUNT" coupled to the output of multiplexer 90 and a second plurality of input terminals for receiving "−1", and an output for providing an end-of-loop signal labeled "PREDICT_TAKEN" to control unit 32. Non-negative detector 100 has a plurality of input terminals coupled to the output of multiplexer 90, and an output for providing a signal labeled "INVALIDATE" to control unit 32. corrected_count register 92 has a plurality of input terminals coupled to the output of adder 96. The count_register 82 has a plurality of output terminals labeled "LATCH_CNT" coupled to the second plurality of input terminals of adder 96. In other embodiments, other means may be used to generate the PREDICT_TAKEN signal, such as for example, address comparison.

Figure 12:
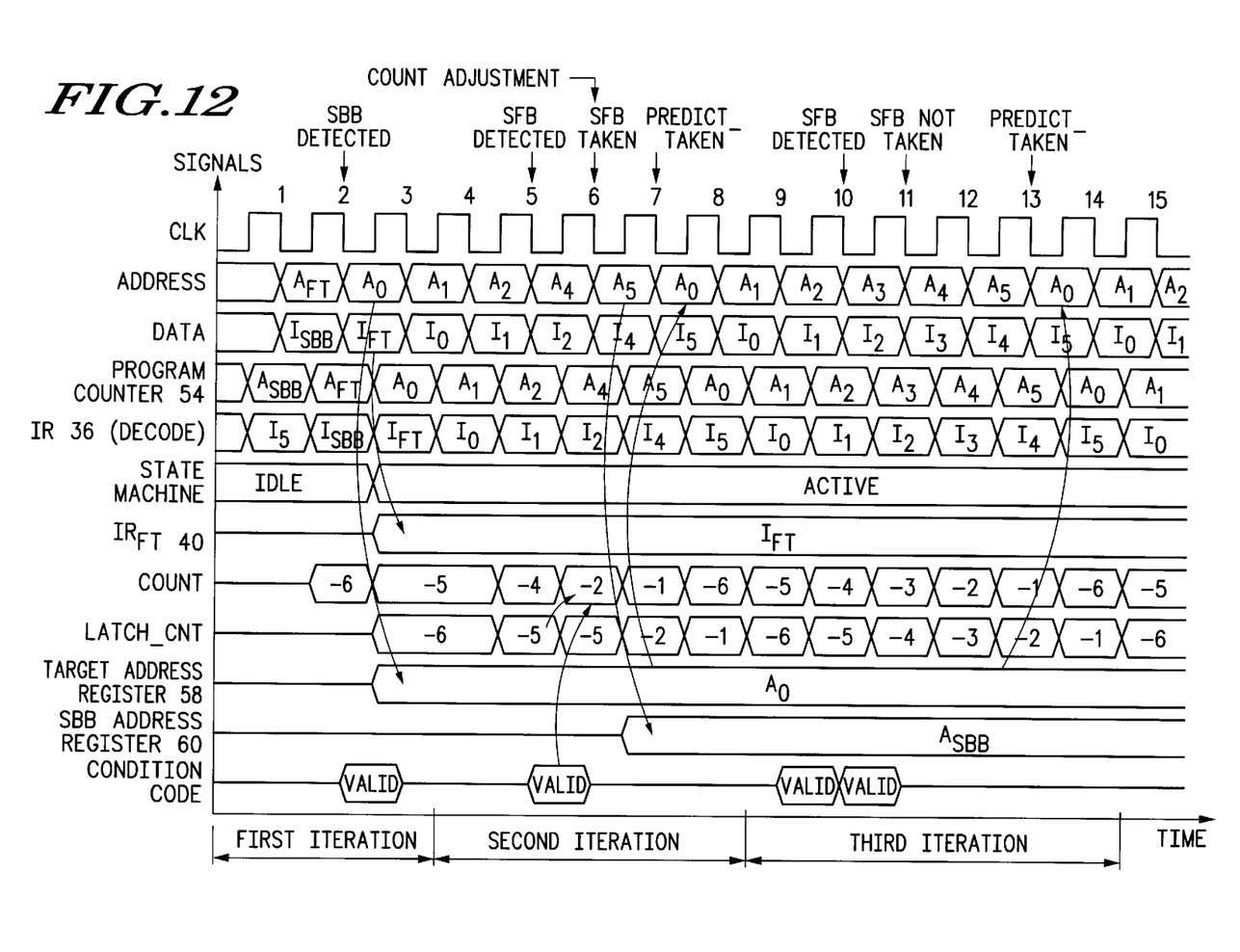
FIG. 12 illustrates a timing diagram of various signals of the data processing system of FIG. 4, using an alternate embodiment, in accordance with the present embodiment.

FIG. 12 illustrates a timing diagram of various signals of the data processing system of FIG. 4 in accordance with the enhanced operation. Referring now to FIGS. 10 through 12, the operation of data processing system 10 will now be discussed for the enhanced scheme.

During the execution of first iteration, a SBB located at address $A_{SBB}$ is detected (in cycle 2). It's lower displacement field is loaded into COUNT of FIG. 11. The SBB is found to be taken in the following cycle. The state machine enters ACTIVE state in the same cycle (cycle 3). Execution continues from $I_0$. At cycle 5, a SFB is detected. During that cycle, COUNT is −4 and LATCH_CNT is −5. The lower displacement field of the SFB, which is +3, is added to LATCH_CNT. Towards the end of second iteration, a prediction is made for the SBB (in cycle 7). The COUNT is re-loaded with −6 from the LD register 94. Since the SBB is predicted correctly to be taken, execution continues from $I_0$. In cycle 10, the same SFB is again detected. The SFB, in this example, is found not taken in cycle 11. As a result, the multiplexer 90 is still selecting to source its input from the output of adder 80, instead of from the output of correct_count register 92. Thus COUNT continues to increment by 1, for each instruction executed. At cycle 13 where the COUNT reaches −1, another prediction is made for the SBB. The execution continues as described earlier.

Generally, the present invention allows branch folding without fetching the branch instruction. For a single-issue, four-stage pipeline data processing system, if the number of iterations is two or less, the number of cycles saved is zero. For three iterations, the number of cycles saved is 2, for four iterations the number of cycles saved is four, and for five iterations, the number of cycles saved is 6. The number of cycles saved can be expressed as 2 m−4, where m is equal to the number of iterations. Also, when a prediction is "mispredicted" there is no cycle penalty as with prior art branch prediction techniques.

The number of cycles saved is achieved with minimal hardware added. Also, because the branch instruction and fall through instruction are not fetched, decoded, and executed after the first iteration, energy is saved and performance is improved.

While the invention has been described in the context of specific embodiments, it will be apparent to those skilled in the art that the present invention may be modified in numerous ways and may assume many embodiments other than that specifically described above. For example, the count or loop value stored in the count register could actually be an address value that is incremented and compared to second address value. Accordingly, it is intended by the appended claims to cover all modifications of the invention which fall within the true spirit and scope of the invention.

What is claimed is:

1. A method of controlling a data processing system, comprising:
fetching a backward branch instruction located at a branch address, the backward branch instruction having an offset value, wherein the backward branch instruction is for performing a branch to a target address back in memory to define a program loop;
fetching and storing a next instruction after the backward branch instruction;
setting a counter value based on the backward branch instruction;
fetching a target instruction at the target address, wherein the target address is based upon the offset value;
incrementing the counter value for each subsequent instruction executed;
determining if the counter value meets a predefined condition and when the counter meets the predefined condition:

fetching a subsequent instruction at a subsequent address wherein the subsequent address is the target address; and resetting the counter based on the offset value; and when the counter does not meet the predefined condition:

fetching the subsequent instruction at the subsequent address wherein the subsequent address is a next instruction address in a program sequence;

repeating the steps of fetching the target instruction, and determining if the counter meets the predefined condition until program flow is transferred outside of the program loop.

2. The method of claim 1 wherein:

the step of setting a counter includes the counter initially being based on the offset value and modifying the counter value once for each instruction encountered; and the step of determining includes the predefined condition being satisfied when a predefined value is successfully compared to the counter value.

3. The method of claim 1 wherein:

the step of setting a counter includes storing an address based on the backward branch instruction; and the step of determining includes determining the predefined condition to be met when the counter is equal to a specified address.

4. The method of claim 1, wherein the backward branch instruction is conditional.

5. The method of claim 1, wherein the backward branch instruction is unconditional.

6. The method of claim 1, wherein the step of setting a counter includes the counter being set equal to the offset value.

7. The method of claim 1, wherein the step of modifying the counter to have a modified counter includes adding a constant to the counter.

8. A method of looping in a data processing system, the method comprising the steps of:

providing instruction memory containing instruction $I_{br-1}$ and a branch instruction $I_{br}$, where instruction $I_{br-1}$ is immediately before branch instruction $I_{br}$ in the instruction memory address space;

fetching and processing branch instruction $I_{br}$;

fetching and processing a target instruction at a target address following the step of fetching and processing the branch instruction;

fetching instruction $I_{br-1}$;

fetching the target instruction at the target address immediately following the step of fetching instruction $I_{br-1}$; and providing the value Ibr+(2*inc) to an address bus, where inc represents the size in bytes of an instruction.

9. A method of looping in a data processing system, the method comprising:

providing instruction memory containing instruction $I_{br-1}$, a branch instruction $I_{br}$, where instruction $I_{br-1}$ is stored immediately before the branch instruction $I_{br}$ in instruction memory address space, and an instruction $I_{br+1}$, where instruction $I_{br+1}$ is stored immediately after the branch instruction $I_{br}$ in instruction memory address space;

fetching and processing branch instruction $I_{br}$, wherein fetching and processing of the branch instruction $I_{br}$ includes the substep of storing a target address;

fetching and saving the instruction $I_{br+1}$ as a saved instruction;

fetching and processing a target instruction at the target address based upon a branch prediction after the step of fetching and saving the instruction $I_{br+1}$, wherein fetching and processing of the target instruction includes the substep of storing the target instruction in a register;

determining that the branch prediction was incorrect and overwriting an instruction register with the saved instruction; and providing the value Ibr+(2*inc) to an address bus, where inc represents the size in bytes of an instruction.

10. A data processing system having an address generation unit comprising:

a first multiplexor having a first input, a second input, and an output;

a program counter register having an input coupled to the first multiplexor output, and an output;

a second multiplexor having a first input, a second input coupled to the output of program counter register, and an output;

a target address register having an input coupled to the output of the first multiplexor, and an output;

a first adder having a first input coupled to the output of the program counter register, a second input for receiving a first increment value, and an output;

a branch address register having an input coupled to the output of the first adder, and an output coupled to the first input of the second multiplexor; and a third multiplexor having a first input coupled to the output of the target address register, a second input coupled to the output of the first adder, and an output coupled to the first input of the first mulitplexor.

11. The data processing system of claim 10 further comprising:

a fourth multiplexor having a first input for receiving a second increment value, a second input for receiving a branch displacement value, and an output; and a second adder having a first input coupled to the output of the second multiplexor, a second input coupled to the output of the fourth multiplexor, and an output for providing the branch target address.

12. A data processing system having an address generation unit comprising:

a multiplexor means having a first input, a second input, and an output for providing a fetch address;

a program counter coupled to receive the fetch address;

a branch target address generator means for providing a branch target address to the first input of the multiplexor, where the branch target address indicates a branch destination address following a taken branch; and a skip-next-sequential address generator means for providing an address of the second instruction following a branch instruction to the second input of the multiplexor means.

* * * * *